United States Patent [19]
Schmidt

[11] Patent Number: 5,946,982
[45] Date of Patent: Sep. 7, 1999

[54] BICYCLE CRANK ARM WITH MULTIPLE CHAIN WHEELS

[75] Inventor: Frank Schmidt, Schweinfurt, Germany

[73] Assignee: SRAM Deutschland GmbH, Schweinfurt, Germany

[21] Appl. No.: 09/063,201

[22] Filed: Apr. 20, 1998

[30] Foreign Application Priority Data

Apr. 25, 1997 [DE] Germany .......................... 197 17 463

[51] Int. Cl.⁶ .................................................. G05G 1/14
[52] U.S. Cl. ........................................ 74/594.2; 74/594.1
[58] Field of Search ............................. 74/594.1–594.6; 474/160, 151, 144

[56] References Cited

U.S. PATENT DOCUMENTS

| | | | |
|---|---|---|---|
| 4,630,503 | 12/1986 | Liu | 74/594.2 |
| 5,062,318 | 11/1991 | Yamazaki | 74/594.1 X |
| 5,480,359 | 1/1996 | Tani . | |
| 5,609,070 | 3/1997 | Lin et al. | 74/594.1 |
| 5,819,599 | 10/1998 | Yamanaka | 74/594.1 |

FOREIGN PATENT DOCUMENTS

| | | | |
|---|---|---|---|
| 508 328 | 10/1992 | European Pat. Off. . | |
| 318003 | 10/1902 | France | 74/594.3 |
| 2416829 | 9/1979 | France | 74/594.1 |
| 295 15 640 | 1/1986 | Germany . | |
| 2270891 | 3/1994 | United Kingdom | 74/594.1 |

*Primary Examiner*—Vinh T. Luong
*Attorney, Agent, or Firm*—Cohen, Pontani, Lieberman & Pavane

[57] ABSTRACT

A weight-saving crank arm having two spaced-apart connecting members extending between the pedal eye and the hub of the crank arm. The connecting members are preferably arranged at a relatively large angle with respect to each other so as to transmit the wheel-turning torque through a cross section having a large moment of inertia $I_z$, where z-axis is the axis transverse to the longitudinal axis of the crank arm. So arranged, one connecting member will carry mostly tensile forces and the other connecting member will carry mostly compressive forces during use. Due to this separation of load-carrying functions, structural properties such as, for example, stiffness and strength of the connecting members can be advantageously optimized. For example, each of the connecting members can be precisely and selectively dimensioned such that the tension-carrying member may have a thicker cross section than that of the compression-carrying member since the compressive strength of a material far exceeds the tensile strength of the same material.

6 Claims, 2 Drawing Sheets

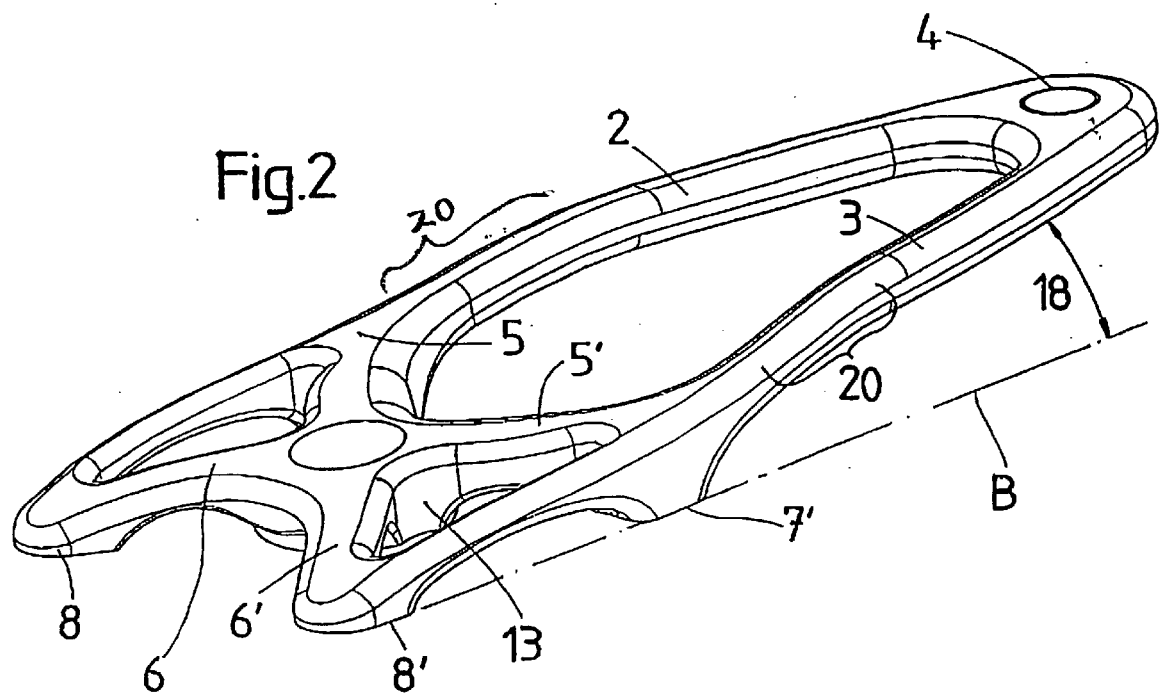
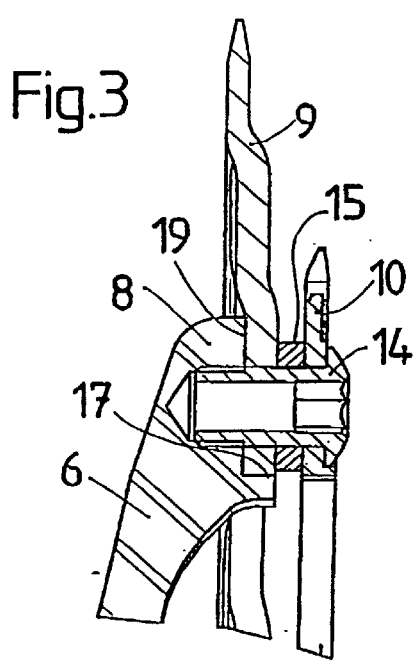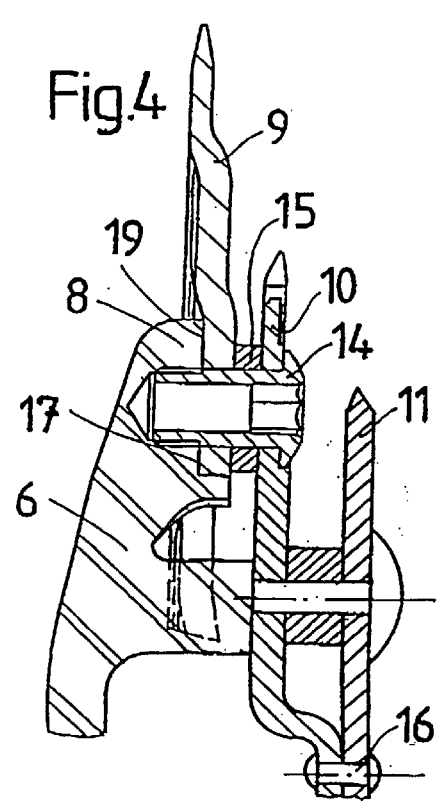

BICYCLE CRANK ARM WITH MULTIPLE CHAIN WHEELS

BACKGROUND OF THE INVENTION

1. Field of the Invention

The present invention relates to bicycle crank arms with multiple chain wheels and, more particularly, to a bicycle crank arm having a plurality of connecting members extending between a pedal eye and a hub.

2. Description of the Related Art

European publication EP 0 508 328 B1 discloses a power-transmitting crank having a rod-like body and a pedal eye and a hub defined at opposite ends. The crank further includes five webs extending radially outwardly from and molded to the hub at an end of the crank. The webs have fastening eyes formed at their ends. The surfaces on the fastening eyes, when viewed in the axial direction, are flat so that a plurality of chain wheels may be fastened thereto with centering means. Since the weight of a bicycle component should be minimized as much as possible, it is conceivable that the number of webs may be reduced by eliminating at least one web. Also, since the rod-like body of the crank must withstand high bending stresses as it transmits wheel-turning torque, it is conceivable that the rod-like body can be made lighter and yet remains sturdy.

German publication DE 295 15 640 U1 discloses a modification of the rod-like crank arm. According to the publication, the crank arm has a double-T profile frame and a plurality of apertures defined along the neutral axis or plane of the crank arm. This design divides the crank arm into a tension-absorbing section and a compression-absorbing section in order to achieve weight savings.

SUMMARY OF THE INVENTION

It is therefore an object of the present invention to produce a weight-optimized crank arm which can be manufactured at low cost.

The presently preferred embodiment of the present invention provides a weight-saving crank arm design having two spaced-apart connecting members extending between the pedal eye and the hub of the crank arm. The connecting members are preferably arranged at a relatively large angle with respect to each other so as to transmit the wheel-turning torque through a large base (which has a large moment of inertia $I_z$, where z-axis is the axis transverse to the longitudinal axis of the crank arm). So arranged, one connecting member will carry mostly tensile forces and the other connecting member will carry mostly compressive forces during use. Due to this separation of load-carrying functions, structural properties such as, for example, stiffness and strength of the connecting members can be advantageously optimized. For example, each of the connecting members can be precisely and selectively dimensioned such that the tension-carrying member may have a thicker cross section than that of the compression-carrying member since the compressive strength of a material far exceeds the tensile strength of the same material.

According to one aspect of the present invention, the two connecting members are connected to the hub through a first and a second web and which provide fastening eyes for attaching the chain wheels.

According to another aspect of the present invention, each of the connecting members preferably includes an extension member projecting past the first and the second web. Each of the extension members provides further attachment with the chain wheels thereby reinforcing the connection between the chain wheels and the crank arm. The connecting members and the extension members are connected to the hub through a plurality of webs which extend radially from the hub. The webs serve to transmit torque from the opposite crank arm (typically, the left crank arm with no chain wheels attached thereto) to the chain wheels through the fastening eyes of the webs. The webs also serve to resist transverse forces imparted by the out-of-plane forces applied to the pedal attached to the crank arm, since the pedal is located outside the plane of the chain wheel.

According to a further aspect of the present invention, the steps for machining the crank arm are minimized in that only one flat face need be machined for fitting or mounting the chain wheels. The machining steps are then limited to machining the thread in the pedal eye, the hub and the fastening eyes. Given the precise dimensioning provided by precision forging, it is even possible to eliminate the step for machining the flat face and the centering means.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

BRIEF DESCRIPTION OF THE DRAWINGS

In the drawings, wherein like reference characters denote similar elements throughout the several views:

FIG. 2 is a perspective view of the crank arm of FIG. 1;

FIG. 3 is a partial sectional view of the crank arm and chain wheel assembly along line 3—3 of FIG. 1; and FIG. 4 is a partial sectional view of another preferred embodiment of the present invention.

DETAILED DESCRIPTION OF THE PRESENTLY PREFERRED EMBODIMENTS

Figure 1:
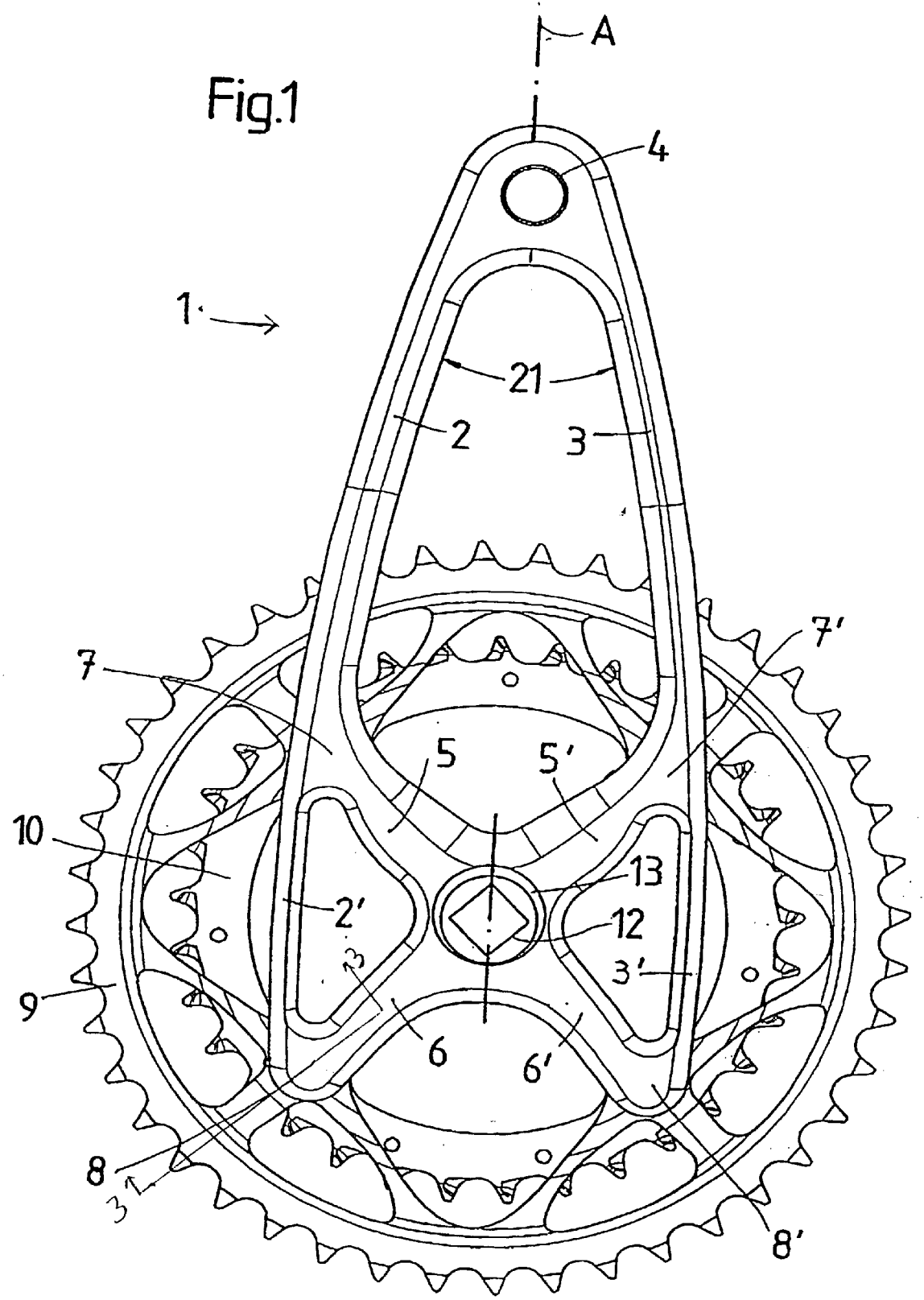
FIG. 1 is a plan view of the presently preferred embodiment of the crank arm of the present invention.

Referring now to FIG. 1, there is shown a preferred embodiment of a crank arm 1 of the present invention. The crank arm 1 includes a pedal eye 4 at one end and a hub 13 at another end. In the case where the crank arm 1 is employed for the pedal drive of a bicycle (not shown), the crank arm 1 is typically attached to a bottom bracket axle (not shown) of the bicycle by means of a fastening profile 12 in the hub 13. A pedal (not shown) may be fastened in the pedal eye 4.

As shown in FIGS. 1 and 2, the crank arm 1 preferably includes a first connecting member 2 and a second connecting member 3, both of which extend from the pedal eye 4 toward the hub 13 and at an angle 21 from each other. Preferably, the angle 21 between connecting members 2 and 3 is between about 20° and 30°20 so as to provide optimal structural rigidity to crank arm 1. The crank arm 1 further includes a first web 5, a second web 5', a third web 6 and a fourth web 6', all of which extend radially outwardly from the hub 13, in a substantially cross-like or star-like pattern. The first web 5 has a first fastening eye 7 and is connected to the first connecting member 2 at or proximate its outer end. Similarly, the second web 5' has a second fastening eye 7' and is connected to the second connecting member 3 at or proximate its outer end. The third web 6 has a third fastening eye 8 and the fourth web 6' has a fourth fastening eye 8' at their respective outer ends. The first connecting member 2 includes an extension member 2' extending between and connecting corresponding outer ends of the first and the third webs 5, 6, and the second connecting member 3 includes an extension member 3' extending between and connecting corresponding outer ends of the second and the fourth webs 5', 6'.

If, as shown in FIG. 1, an axis A is defined through the pedal eye 4 and the hub 13, then it can be readily appreciated that the crank arm 1 is substantially or essentially symmetrical about the axis A, the only possible difference being the difference in the cross-sectional shape or size of the first and second connecting members 2 and 3. In a particular application where the first connecting member 2 is loaded in tension (but not in compression) and the second connecting member 3 is loaded in compression (but not in tension), the first connecting member 2 preferably has a different cross section (e.g. larger cross sectional thickness) than that of the second connecting member 3. This design is especially desirable where the tensile strength of the material from which the crank arm 1 is constructed is substantially less than the compressive strength of the material.

As illustrated in FIG. 2, a plane B lying along the plane of the first chain wheel 9 (as determined by the mounting surfaces of fastening eyes 7, 7', 8 and 8') may form an angle 18 with the connecting members 2, 3 (or a plane transverse to the longitudinal axis of pedal eye 4) so as to ensure adequate spacing between the pedal eye 4 and the chain drive, in particular with respect to the first chain wheel 9. The angle 18 may be very small if each of the first and the second connecting members 2, 3 includes an incline region 20 disposed proximate the first and second fastening eyes 7, 7' respectively and configured for inclining the first and the second connecting members at another angle from plane B such that the pedal eye 4 would be appropriately spaced from the first chain wheel 9.

FIGS. 3 and 4, by way of example, show the attachment of the first (typically, the largest) chain wheel 9 and a second chain wheel 10 to the fastening eye 8 of the third web 6 by means of a hollow screw 14. The two chain wheels 9 and 10 are fastened against a a substantially flat mounting face 19. If the face 19 is machined, it is preferable that a centering means 17 for centering at least one of the chain wheels 9 and 10 be turned. If the face 19 is not machined, then the centering means 17 may be eliminated, and the chain wheels 9 and 10 may be screwed to the fastening eyes 7, 7', 8, and 8' and centered only through hollow screws 14.

FIG. 4 shows preferred embodiment wherein a third chain wheel 11 is centered on and attached to a second fastening eye (not shown), but for weight-minimizing reasons, the third chain wheel 11 is connected to the second chain wheel 10 through at least one connecting rivet 16. However, it is not important how many or in what manner the chain wheels are fastened to the fastening eyes 7, 7', 8, 8'. In each case, however, the chain wheels 9, 10, 11, for example, are attached to the flat face 19, which does not need to be machined at all if it is used as a fitting for the remaining machining of the threaded points.

Although FIGS. 3 and 4 are directed to the third web 6, it is contemplated that the other webs 5, 5', 6' may have similar attachment mechanisms as that of the third web 6.

While there have shown and described and pointed out fundamental novel features of the invention as applied to preferred embodiments thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. It is the intention, therefore, to be limited only as indicated by the scope of the claims appended hereto.

I claim:

1. A crank arm for a bicycle having a chain wheel, a pedal and a bottom bracket axle, comprising:

a pedal eye disposed at one end of the crank arm and attachable to the pedal of the bicycle;

a hub disposed at another end of the crank arm and attachable to the bottom bracket axle of the bicycle, said hub including a first, a second, a third, and a fourth web extending radially outwardly from said hub, each of said first, second, third and fourth webs having an end and including a first, a second, a third, and a fourth fastening eye attachable to the chain wheel;

a first connecting member extending from said pedal eye to said end of said first web;

a first extension member extending between and connecting said ends of said first and said third web;

a second connecting member extending from said pedal eye to said end of said second web at an angle from said first connecting member, said angle being between about 20° and 30°; and a second extension member extending between and connecting said ends of said second and said fourth web, said first and said second connecting members being substantially symmetrical about a longitudinal axis extending through the pedal eye and the hub.

2. The crank arm of claim 1, wherein each of said first, second, third, and fourth fastening eyes has a substantially flat face for attachment with the chain wheel.

3. The crank arm of claim 2, wherein the substantially flat faces of the first, the second, the third and the fourth fastening eyes define a first plane, the first and the second extension members being arranged at an angle to the first plane.

4. The crank arm of claim 3, wherein the first and the second connecting members include incline regions disposed proximate said first and said second fastening eyes respectively for inclining said first and said second connecting members at another angle from the first plane.

5. The crank arm of claim 1, wherein the first, the second, the third and the fourth web are arranged in a substantially star-like pattern about said hub.

6. The crank arm of claim 1, wherein the first connecting member has a cross section thicker than that of the second connecting member.

* * * * *